United States Patent [19]

Caldwell

[11] 4,430,315
[45] Feb. 7, 1984

[54] CATALYTIC DECOMPOSITION OF HYPOCHLORITE USING SUBSTITUTED COBALT OXIDE SPINELS

[75] Inventor: Donald L. Caldwell, Lake Jackson, Tex.

[73] Assignee: The Dow Chemical Company, Midland, Mich.

[21] Appl. No.: 334,791

[22] Filed: Dec. 28, 1981

[51] Int. Cl.$^3$ .................... C01D 3/04; C01B 13/02
[52] U.S. Cl. .................... 423/499; 423/579; 423/491
[58] Field of Search .............. 423/499, 579, 491; 210/756, 763; 204/290 F

[56] References Cited

U.S. PATENT DOCUMENTS

| | | | |
|---|---|---|---|
| 1,153,502 | 9/1915 | Kriegsheim | 423/579 |
| 4,061,549 | 12/1977 | Hazelrigg | 204/252 |
| 4,073,873 | 2/1978 | Caldwell | 423/499 |
| 4,297,333 | 10/1981 | Crawford | 423/473 |

Primary Examiner—Jack Cooper
Attorney, Agent, or Firm—W. J. Lee

[57] ABSTRACT

Hypochlorite ions in aqueous solution are catalytically decomposed by the action of a poly-metal spinel of cobalt preferably coated on an inert, stable support. The spinel catalyst may contain dispersed therein, optionally, other "modifier" metal oxides which contribute better adherence of the spinel to the substrate and improve the toughness of the spinel coating. The substituted cobalt spinel conforms generally to the empirical formula $$M_x N_y Co_{3-(x+y)} O_4$$

where zero $< x \leq 1$; zero $\leq y \leq 0.5$; M is at least one metal of Periodic Table Groups IB, IIA, and IIB; N is at least one metal from Group IA; and zero $< (x+2y) \leq 1$.

12 Claims, No Drawings

CATALYTIC DECOMPOSITION OF HYPOCHLORITE USING SUBSTITUTED COBALT OXIDE SPINELS

BACKGROUND OF THE INVENTION

It is known from U.S. Pat. No. 4,073,873 that a single-metal cobalt spinel, $Co_3O_4$, is effective as a catalyst for decomposing hypochlorites. The present invention comprises improvements in such cobalt spinel catalysts. U.S. Pat. No. 4,073,873 is incorporated herein by reference.

Aqueous solutions containing hypochlorite ions, $[ClO]^-$, are corrosive to many metals and are highly toxic to aquatic life. Hypochlorite-containing solutions which are evolved as waste streams or side-products require treatment to remove or destroy the deleterious hypochlorite ions before the aqueous stream can be released into rivers, bays or ther public waters. Aqueous waste streams containing hypochlorite ions are produced, for example, by chlor-alkali production facilities.

Various methods are known for destroying hypochlorites, but they are too inefficient or too expensive for large scale applications involving very large quantities of aqueous streams which contain hypochlorites.

Thermal decomposition may be used in some cases, but when large quantities of dilute hypochlorites require decomposition, the cost of heat (energy) becomes prohibitive, and the rate of decomposition is inefficiently slow. In addition to the cost of the heat, it is necessary in some instances to cool the aqueous stream before it reaches public waters in order to avoid "thermal pollution." Cooling the aqueous stream requires extra handling and energy consumption and therefore, increased costs.

Actinic radiation (light) accelerates the decomposition, but this requires either using large glass vessels (impractical) or the use of light sources inside opaque vessels and is inefficiently slow for large scale use.

Hypochlorite is chemically reactive, but proposed reactants are either expensive (e.g., $H_2O_2$), tend to produce deleterious side products (e.g., NaHS), or require concentrated solutions (e.g., HCl). Usually the reaction product would require recovery because of ecological or economical reasons.

It is well known that certain transition metal ions (e.g., from transition metal salts) catalyze the decomposition of hypochlorite to chloride ion plus molecular oxygen. However, practical utilization of this knowledge has been hindered by the reactivity and/or solubility of these transition metal ions in the solutions in which hypochlorite is likely to be found. It has been proposed that soluble transition metal salts be added to waste streams to decompose hypochlorite, but this would require an expensive and complex recovery step to prevent loss of the expensive transition metal ion and would risk the consequent pollution of the waste stream by the heavy metals.

Exemplary patents showing preparation of various cobalt spinels of the single-metal and bimetal varieties are, e.g. U.S. Pat. Nos. 3,977,958; 4,061,549; and 4,142,005. Other disclosures of related metal oxides are found, e.g., in U.S. Pat. Nos. 3,711,397; 3,704,644; 3,689,382; 3,689,384; 3,711,382; 3,773,555; 3,103,484; 3,775,284; 3,773,554; and 3,663,280.

It is an object of the present invention to provide improvements in the cobalt spinel catalytic method for destroying hypochlorites in aqueous streams.

This and other objects are attained by the invention disclosed hereinafter. Variations in the embodiments described herein will become apparent to practitioners of the pertinent art without departing from the invention claimed.

SUMMARY OF THE INVENTION

Hypochlorite decomposition catalysts comprising cobalt oxide spinel are improved by employing such spinels having at least a portion of the cobalt in the spinel crystal lattice replaced by at least a small proportion of at least one other metal.

DETAILED DESCRIPTION OF THE INVENTION

The hypochlorite-containing aqueous solutions which are treated in the present invention may be any aqueous solution which contains hypochlorite moieties, e.g., hypochlorous acid or salts of hypochlorous acids, such as alkali metal hypochlorites.

One well-known source of aqueous streams containing hypochlorite ions as a "waste" material is in the scrubbing step of a chlorine liquifaction plant where the non-condensibles (usually called "tail gas") are scrubbed with a caustic solution to prevent residual chlorine in the "tail gas" from entering the atmosphere. This scrubbing stream effluent contains alkali metal hypochlorite (e.g., NaOCl) which requires decomposition to, e.g., NaCl and $O_2$ before being discharged into public waters, such as bays or other estuaries. There are other sources of hypochlorite-containing aqueous waste streams which are treatable by the present invention, especially in operations involved in, or related to, chlor-alkali production.

The "substituted cobalt oxide spinels" of the present invention conform generally to the formula $$M_xN_yCo_{3-(x+y)}O_4$$

where $zero < x \leq 1$; $zero \leq y \leq 0.5$; M is at least one metal of Periodic Table Groups IB, IIA, and IIB; N is at least one metal from Group IA; and $zero < (x+2y) \leq 1$. Within these numerical parameters the metals M and N are found to substantially substitute for cobalt ions in the crystal lattice structure; the presence of excessive amounts of metals M and N during spinel formation tend to form separate oxide phases (non-spinel) distributed among the spinel crystals.

Another way of distinguishing the present cobalt oxide spinels from the previously used single-metal cobalt spinels, is to call these "polymetal cobalt spinels" which includes bimetal spinels, trimetal spinels, quadrametal spinels, etc., where cobalt is the predominant metal in the spinel lattice structure.

Group IB includes Cu, Ag, and Au, with Cu being preferred.

Group IIA includes Be, Mg, Ca, Sr, Ba, and Ra, with Mg being preferred.

Group IIB includes Zn, Cd, and Hg, with Zn being preferred.

Group IA includes Li, Na, K, Rb, Cs, and Fr, with Li being preferred.

Examples of some of the preferred substituted cobalt oxide spinels are as follows:

$Zn_xCo_{(3-x)}O_4$, where x is from about 0.1 to 1;

$Cu_xCo_{(3-x)}O_4$, where x is from about 0.1 to 1;

$Mg_xCo_{(3-x)}O_4$, where x is from about 0.1 to 1;

$Zn_xLi_yCo_{3-(x+y)}O_4$, where x is from about 0.1 to about 0.9, y is from about 0.05 to about 0.45, and (x+y) is from about 0.15 to about 0.95;

$Cu_xLi_yCo_{3-(x+y)}O_4$, where x is from about 0.1 to about 0.9, y is from about 0.05 to about 0.45, and (x+y) is from about 0.15 to about 0.95;

$Mg_xLi_yCo_{3-(x+y)}O_4$, where x is from about 0.1 to about 0.9, y is from about 0.05 to about 0.45, and (x+y) is from about 0.15 to about 0.95;

$Mg_xZn_{x'}Li_yK_{y'}Co_{3-(x+x'+y+y')}O_4$, where (x+x') is from about 0.1 to about 1.0, (y+y') is from about 0 to about 0.5, and (x+x'+y+y') is from about 0.1 to about 1.0.

Optionally, but preferably, the substituted cobalt oxide spinel catalyst structures of this invention contain a "modifier oxide" as fully described below.

The spinel crystal structures are readily identified by x-ray diffraction analysis methods such as taught by H. P. Klug, et al. in *X-Ray Diffraction Procedures* published by John Wiley & Sons, NYC (1954) or by using a standard Norelco Goniometer equipped with an AMR monochromator on the receiving detector assembly, using unfiltered $CuK_\alpha$ radiation.

The "modifier oxide" used optionally in the present invention may be any metal oxide which is essentially stable with respect to the aqueous solution in which it is intended to be used and which does not destroy or disrupt the substituted spinel crystalline structure in which the modifier oxide is dispersed. Among the metals whose oxides may be used herein are those of Groups III-A, III-B, IV-A, IV-B, V-A, V-B, VI-B and VII-B and the lanthanides and actinides of the Periodic Table. More than one modifier oxide may be used in the same cobalt spinel catalyst structure.

Preferably, the modifier oxides are oxides of metals selected from the group consisting of zirconium, tungsten, lead, vanadium, tin, tantalum, niobium, molybdenum, aluminum, cerium, bismuth, chromium, antimony and titanium.

Most preferably, the modifier oxides are oxides of zirconium, vanadium and lead. $ZrO_2$ is especially preferred.

The substrate employed in the present invention is any solid substrate to which the spinel coating will attach and which is essentially stable (inert) with respect to chemical attack from the aqueous solution being treated. The substrate is preferably in a form which will expose a relatively high ratio of surface area/volume of the spinel catalyst, yet which will have sufficient physical integrity that it will not be easily attrited, decrepitated or otherwise broken during normal usage, handling and recovery. Also, it is preferred that the particles of supported catalyst not be so small and free to move that they become too easily entrained in the aqueous stream leaving the treating vessel.

The substrate may be a noble or substantially inert metal, a film-forming metal (also called "valve metal"), or an essentially inert non-metal or inorganic material such as ceramic, glass, graphite, refractory, asbestos, mineral fibers, and others. Supports such as high-temperature stable polymers and resins may be employed as substrates but are not generally preferred and not very many are capable of withstanding temperatures above 200° C., which temperature is at about the lower end of the temperature range needed to form the spinel.

Among the noble or substantially inert metals which may be used as substrates are, e.g., platinum, palladium and ruthenium. These are operable, but are also very expensive.

Among the film-forming metals which may be used as substrates are, e.g., titanium, tantalum, niobium, molybdenum, zirconium, vanadium, tungsten and hafnium. These film-forming metals may be employed with or without the oxide film which forms on the surface when exposed to oxygen.

Among the ceramics, glass, refractories, and other inorganic materials which may be used as substrates are, e.g, soda lime glass, borosilicate glass, vitreous silica, alumina, titania, zirconia, silica, magnesia, aluminum silicate, zirconium silicate, magnesium aluminate, chemical porcelain, chemical stoneware, oyster shell, limestone, dolomite. Aluminum silicate, alumina and chemical stoneware are preferred.

The substrate may be of almost any form and shape, e.g., small plates, rods, cylinders, blocks, spheres, screens, or "saddles." Foraminous substrates offering high ratios of surface area/volume are very suitable, especially if the foraminous substrate has the physical integrity to substantially withstand handling and long-term usage without much breakage. Particulate cobalt spinel, when pressed under high pressure into pellet form, is an effective catalyst. Also cobalt spinel which is deposited onto a particulate substrate and then pelletized is an effective catalyst. It is preferred that when the supported catalyst is to be "packed" into a treating tower or other vessel, the configuration of the substrate pieces be such that not more than a minimum amount of "blinding" or "channelling" is obtained.

In the case of substrates made of inorganic materials, e.g., ceramic, glass or refractory material, the shape and size of the well-known "Berl Saddles" offers an efficient combination of surface/volume, physical strength and non-blinding for use in packed towers. The material from which the Berl Saddles are made is known as chemical stoneware. Among the refractory materials suitable for use as the substrate, ceramic balls or pellets of aluminum silicate, such as those sold by Norton under the tradename "DENSTONE," are particularly suitable.

In the case of metal screen substrates, these can normally be easily stacked in planar fashion in such a way that the holes do not exactly line up "in-row," whereby blinding or channelling is substantially avoided.

Once the present invention is learned, it is considered to be within the skill of a trained engineer or other technologist to select the best shape, size and disposition of the supported catalyst for his particular application and apparatus.

The spinel coating is applied to the substrate by applying thermally-decomposable, thermally-oxidizable precursor compounds to the substrate, then heating in air at a temperature in the range of about 200° C. to about 600° C. The heating time required is usually from about 5 minutes at the upper end of the temperature range to several hours at the lower end of the temperature range. This temperature range is fairly critical; at temperatures much below about 200° C. the process is inefficiently slow and substantially complete formation of the desired spinel is not assured, while at temperatures much above about 600° C. (especially at extended heating times) substantially complete retention of the spinel structure is not assured. At temperatures approaching about 700°-750° C., a substantially different form of cobalt oxide structure is apparently formed, especially if one or more modifier oxides are being simultaneously applied. The preferred temperature is in the range of about 300° C. to 450° C. for a period of about 10 minutes to 3 hours.

Generally, the coating operation provides, at each coating application, a very thin layer of the spinel. Therefore, in order to be assured that a good, strong, long-life coating is obtained with few or no pin-holes, it is advantageous and preferable to repeat the coating step at least once. Several coatings may be applied, if desired.

The modifier metal oxide is provided in the spinel layer by being mixed, as metal oxide, with the thermally-oxidizable cobalt compound and substituent compound(s) at the time these compounds are applied to the substrate or may be formed along with the substituted cobalt spinel from a thermally-decomposable, thermally-oxidizable compound of the metal. Organic salts and many inorganic salts of the metals are particularly suitable as a source material (precursor) for the modifier metal oxides.

Thermally-decomposable, thermally-oxidizable cobalt compounds and substituent compounds suitable for forming the substituted cobalt spinels include, but are not limited to, organic metal compounds, e.g., metal naphthenate, metal octoate, and other metal salts of fatty acids or other organic metal salts. Also, inorganic metal compounds such as metal salts of mineral acids (e.g., metal nitrate, metal chloride, metal sulfate, metal hydroxide, metal carbonate and the like) may be used and are generally preferred over the use of the organic metal compounds. Particularly suitable and preferred as the cobalt precursor is the use of hydrated cobalt nitrate applied to the substrate as a melt or cobalt nitrate carried in an easily volatilized medium such as water, acetone, alcohol, aldehyde, ketone, ether or cyclic ether along with the substituent metal precursors.

The use of the modifier oxide serves to provide an extender for, or to enhance or improve the adherence of the substituted cobalt spinel to the substrate and to provide a "tougher" coating of the spinel, thereby obtaining a spinel coating which will better withstand handling without being broken or chipped. The amount of modifier oxide, when employed, may be from zero up to about 50 mole percent of the total coating, preferably about 0 to about 30 mole percent. As used herein, the term "mole percent" refers to the amount of modifier metal oxide, measured as metal, in the total metal content of the coating. As the mole ratio of spinel/modifier metal oxide in the coating approaches 1/1, the crystallinity, as shown by X-ray diffraction, is found to diminish considerably. Other inert, stable material may be employed as "fillers" or "extenders" in the spinel catalyst without departing from the present invention, though such additives may have little or no effect on the catalyst activity. For instance, sand, asbestos fibers or graphite particles may be incorporated into the spinel catalyst.

As stated hereinbefore, it is preferred that the spinel coating be applied by a plurality of applications where each application consists of applying a coating of the thermally-oxidizable cobalt compound and substituent compound and then heating in the range of about 200° C. to about 600° C. It appears that during the heating period for each susequent coating, the previous layer of spinel is densified or compacted because of the additional heat. This densification or compacting appears to give a stronger coating than if a single heating period is employed.

The following examples are given to demonstrate certain embodiments, but the invention is not limited to the embodiments shown. In the following demonstrations, opaque equipment is used in order to avoid the effect of actinic radiation.

EXAMPLE 1

(includes a comparison test)

This example includes a comparison of a polymetal cobalt spinel of the present invention with a single-metal cobalt spinel ($Co_3O_4$) such as shown in U.S. Pat. No. 4,073,873.

Solution A is prepared by dissolving a sufficient quantity of cobalt nitrate hexahydrate, $Co(NO_3)_2 \cdot 6H_2O$, in deionized water to produce a solution which is 4 molar in cobalt ion.

Solution B is prepared by dissolving sufficient quantities of cobalt nitrate hexahydrate, zinc nitrate hexahydrate ($Zn(NO_3)_2 \cdot 6H_2O$), and zirconyl nitrate ($ZrO(NO_3)_2$) in deionized water to produce a solution which is approximately 4 molar in total dissolved metal ions, and which contains said metal ions in the approximate molar ratio of 10Co:5Zn:1Zr.

Catalyst pellets are produced by the following procedure, where "raw pellets" designates DENSTONE cylindrical ceramic pellets ($\frac{1}{4}''$ O.D. $\times \frac{3}{8}''$ long) supplied by The Norton Company.

Pellet Preparation:

1. Immerse raw pellets in aqueous solution of 2.0 wt.% HF+4.0 wt.% HCl for at least 15 minutes. New pellets have a glazed appearance. After acid treatment the pellets are visibly etched, having a uniformly roughened surface.

2. Rinse the etched pellets with cold water; allow the excess water to drain off.

3. Immerse some of the rinsed pellets in Solution A and some in Solution B. Allow excess solution to drain off.

4. Bake the pellets at 400±10° C. for 12±3 minutes. Time to reach temperature is not critical. Nitrogen oxides are evolved during the baking process.

5. Allow the pellets to cool.

6. Repeat steps 3, 4, 5, twice (3 coats total).

A stock hypochlorite solution is prepared by diluting 380 ml of a 6% commercial bleach solution (NaOCl) with 1500 ml of deionized $H_2O$ and acidifying to pH8 with conc. HCl. Then 100 ml of the stock solution is placed in a 200 ml round bottom flask (which has been coated with black paint to exclude light) along with 90 gm. of the catalyst to be tested. The oxygen released by decomposition of the hypochlorite by the reaction $$OCl^- \rightarrow \tfrac{1}{2}O_2 \pm Cl^-$$

is collected in a gas burette. The volume of oxygen evolved is measured as a function of time. Complete decomposition releases approximately 80.0 ml of $O_2$. The reaction is found to follow first-order kinetics; its rate is characterized by the "half-life," defined as $$T_{\frac{1}{2}} = \ln 2 \cdot \Delta t / \Delta \left( \ln \frac{a_o}{a_o - x} \right)$$

where t is time in minutes, $a_o$ is the total ml $O_2$ evolved (80 ml), and x is the ml of $O_2$ evolved after time t. Catalyst prepared from Solution A is found to give a half-life of 10.5 minutes; this catalyst coating is a $Co_3O_4$ coating of the prior art. Catalyst prepared from Solution B is found to give a half-life of 6.4 minutes; this catalyst coating of the present invention, has a nominal composition of $ZnCo_2O_4.0.2ZrO_2$. The half-life of the present catalyst coating shows a 39% improvement over the prior art coating.

EXAMPLE II

Other polymetal spinel coatings (especially containing $ZrO_2$ dispersed therein) which are effective as catalytic material for hypochlorite decomposition are, for example;

$Li_{0.125}Zn_{0.5625}Cu_{0.1875}Co_{2.125}O_4$
$Li_{0.375}Zn_{0.25}Co_{2.375}O_4$
$Li_{0.25}Zn_{0.50}Co_{2.25}O_4$
$Li_{0.125}Zn_{0.5625}Mg_{0.1875}Co_{2.125}O_4$
$Li_{0.125}Zn_{0.75}Co_{2.125}O_4$
$Li_{0.125}Cu_{0.75}Co_{2.125}O_4$
$Zn_{0.75}Mg_{0.25}Co_2O_4$
$Zn_{0.5}Co_{2.5}O_4$
$Zn_{0.5}Ba_{0.5}Co_2O_4$
$Zn_{0.5}Sr_{0.5}Co_2O_4$
$Li_{0.125}Mg_{0.75}Co_{2.125}O_4$
$Zn_{0.5}Cu_{0.5}Co_2O_4$
$Zn_{0.5}Cd_{0.5}Co_2O_4$
$ZnCo_2O_4$
$Zn_{0.25}Ag_{0.375}Co_{2.375}O_4$
$Zn_{0.25}Co_{2.75}O_4$
$Zn_{0.5}Mg_{0.5}Co_2O_4$
$Zn_{0.5}Ca_{0.5}Co_2O_4$

I claim:

1. In a process of catalytically decomposing hypochlorites into oxygen and chloride by use of a cobalt spinel catalyst, the improvement which comprises
using a substituted cobalt spinel catalyst which conforms generally to the spinel structure $$M_xN_yCo_{3-(x+y)}O_4$$

where zero$<x\leq 1$; zero$\leq y\leq 0.5$; zero$<(x+2y)\leq 1$; M is at least one metal of Periodic Table Groups IB, IIA, and IIB; and N is at least one metal from Group IA, wherein the "half life" of the decomposition of hypochlorite into oxygen and chloride using the substituted cobalt spinel catalyst is less than "half life" of said decomposition using unsubstituted $Co_3O_4$ spinel catalyst.

2. The process of claim 1 wherein M is at least one of the group comprising Zn, Cu, and Mg.

3. The process of claim 1 wherein N is at least one of the group comprising Li, Na, and K.

4. The process of claim 1 wherein M is at least one of the group comprising Zn, Cu, and Mg and N is at least one of the group comprising Li, Na, and K.

5. The process of claim 1 wherein the substituted cobalt spinel catalyst contains at least one modifier metal oxide selected from the oxides of the metals of Periodic Table groups III-A, III-B, IV-A, IV-B, V-A, V-B, VI-B, VII-B, the lanthanides, and the actinides.

6. The process of claim 1 wherein the substituted cobalt spinel catalyst contains at least one modifier metal oxide selected from the oxides of zirconium, tungsten, lead, vanadium, tin, tantalum, niobium, molybdenum, aluminum, cerium, bismuth, chromium, antimony, and titanium.

7. The process of claim 6 wherein the modifier metal oxide is at least one oxide of zirconium, vanadium, and lead.

8. The process of claim 7 wherein the modifier metal oxide is zirconium oxide.

9. The process of claim 1 wherein the substituted cobalt spinel catalyst is supported by a substrate.

10. The process of claim 9 wherein the substrate is a substantially inert metal or inorganic material.

11. The process of claim 9 wherein the substrate is an inorganic material of ceramic, glass, graphite, refractory, or mineral composition.

12. The process of claim 9 wherein the substrate is a particulate or pellet form of ceramic aluminum silicate.

* * * * *

UNITED STATES PATENT AND TRADEMARK OFFICE
CERTIFICATE OF CORRECTION

PATENT NO. : 4,430,315

DATED : February 7, 1984

INVENTOR(S) : Donald L. Caldwell

It is certified that error appears in the above—identified patent and that said Letters Patent is hereby corrected as shown below:

Col. 1, line 20 "ther" should be --other--.
Col. 5, line 66 "susequent" should be --subsequent--.
Col. 6, line 57 "$OCl^- \rightarrow \frac{1}{2}O_2 \pm Cl^-$" should be --$OCl^- \rightarrow \frac{1}{2}O_2 + Cl^-$--.
Col. 8, line 4 insert --the-- after "than".

Signed and Sealed this

Twenty-sixth Day of June 1984

[SEAL]

Attest:

GERALD J. MOSSINGHOFF

Attesting Officer

Commissioner of Patents and Trademarks